United States Patent [19]

Hibbard et al.

[11] Patent Number: 4,866,109

[45] Date of Patent: Sep. 12, 1989

[54] METHOD OF MAKING REINFORCED MATERIALS HAVING AN IMPROVED REINFORCING MATERIAL THEREIN

[75] Inventors: Billy B. Hibbard; Joe A. Mann, both of Williamsburg; Frans P. P. Koeleveld, Newport News, all of Va.; Agnes K. Potepan, Canandaigua, N.Y.; Richard E. White, Newark, N.Y.; Barry T. Knight, Fairport, N.Y.; Howard H. Bryant, Palmyra, N.Y.

[73] Assignee: BASF Corporation, Williamsburg, Va.

[21] Appl. No.: 660,629

[22] Filed: Oct. 15, 1984

Related U.S. Application Data

[63] Continuation of Ser. No. 479,586, Mar. 28, 1983, abandoned, which is a continuation of Ser. No. 214,838 filed Dec. 10, 1980 abandon.

[51] Int. Cl.⁴ .................... C04B 31/34; C08L 35/04
[52] U.S. Cl. ............................................ 524/5; 524/2
[58] Field of Search ........................................ 524/2, 5

[56] References Cited

U.S. PATENT DOCUMENTS 4,414,031  11/1983  Studinka ............................. 106/90

Primary Examiner—Patricia Short
Attorney, Agent, or Firm—Tom R. Vestal; Rupert B. Hurley, Jr.

[57] ABSTRACT

The invention is specifically concerned with an improvement in the process of manufacturing reinforced materials. The reinforced materials are conceived to include a wide variety of materials, the most notable being high density compressed gaskets. The improvement comprises mixing a cut solid (generally a cut fiber) with a body material to produce the reinforced materials. The solid is cut into particulates of highly variable size, the range in the size of the particulates being adjusted to optimize the characteristics of the resulting reinforced material. The cut solid is produced utilizing comminuting machines previously used for the recycle of waste products.

12 Claims, No Drawings

METHOD OF MAKING REINFORCED MATERIALS HAVING AN IMPROVED REINFORCING MATERIAL THEREIN

CROSS REFERENCE

This application is a continuation of application Ser. No. 479,586 of Nov. 28, 1983 which is a continuation of Ser. No. 214,838 filed Dec. 10, 1980 now both abandoned.

BACKGROUND OF THE INVENTION

1. Field of the Invention

This invention pertains to the field of reinforced materials and methods for their manufacture, and is particularly concerned with an improvement in the process of making reinforced materials, the improvement specifically concerning the nature of the reinforcing material itself, and the incorporation of the reinforcing material into a body material which is to be reinforced. The physical appearance of the "mix" of particulates with a body material is used to determine the necessary characteristics of the particulates for a given reinforcing material. The proportion of particulated reinforcing material which may be incorporated into a body material is dependent upon the physical and chemical characteristics of the reinforcing material and the body material.

2. Description of the Prior Art

The closest prior art known to the applicants is U.S. Pat. Nos. 3,813,048, 2,631,668 and 3,102,063. The first two patents are concerned with cutters, the first of which is similar to cutters used to produce the reinforcing material of the present invention, and the second of which is used to produce short uniform-length staple. Although U.S. Pat. No. 3,813,048 discloses the cutting of materials in substantially the same manner as in the present invention, it does not disclose the characteristics of the cut product nor the use to which that product is put in the process of the present invention. U.S. Pat. No. 3,102,063 is considered to be in an irrelevant field of art. Also, U.S. Pat. No. 3,102,063 discloses a particle size dependence of a papermaking sheet production process. However, the particle type, origin and function and the size range used in U.S. Pat. No. 3,102,063 are considered to be wholly different from the characteristics of the particles used in the process of the present invention. The particles referred to in U.S. Pat. No. 3,102,063 are employed as "body" components while the particulates of concern in the process of the present invention are employed as "reinforcing" components.

BRIEF SUMMARY OF THE INVENTION

The present invention is concerned with an improvement in the process of producing reinforced materials, and in particular with the cutting of a solid to produce a reinforcing material. The reinforcing material is then mixed with a body material, and the mixture is then treated to form a reinforced material. It has been unexpectedly found that a solid may be cut into particulates having a very small size and a particle size distribution which enhances the mixing of the particulates with a body material. The cut particulates have a size range which permits both a high degree of mixing and a high degree of reinforcement when the particulates of reinforcing material are mixed with a body material. The high degree of mixing and reinforcement occur to an extent to which particulates will not permit when cut to any single uniform size. Disclosed herein are the necessary characteristics of the reinforcing material and the body material, related to one another in terms of the particle size range of the reinforcing material, the chemical characteristics of both the reinforcing and the body materials, and the relative amounts of reinforcing material and body material necessary to create reinforced materials.

DETAILED DESCRIPTION OF THE PREFERRED EMBODIMENT

While this invention may be embodied in many different forms, it will be described primarily in terms of several preferred embodiments in order to shed light on the principles involved in carrying out the process of the present invention.

All of the embodiments of the process of the present invention involve the cutting of a solid into particles of variable size, a particular set of cut particles of variable size hereafter being designated as a "minisolid". The designation of the particles as a "minisolid" is used because the particles are generally small in size. The selection of the "minisolid" is dependent upon the body material to be reinforced and the characteristics of the material to be cut into the minisolid. It has been unexpectedly found that a particular minisolid will simultaneously enhance the degree of mixing of the minisolid with a body material to be reinforced by the minisolid while incorporating into the body material enough of the larger particulates within the minisolid to give the resulting mixture a higher degree of reinforcement than could be achieved by the process if particulates of any one substantially uniform size were incorporated into the body material. It has been theorized from the above discovery that the smaller particulates within a minisolid are generally more of an aid to the mixing of the minisolid with a body material, while the larger particulates within a minisolid are thought to be responsible for giving a high degree of reinforcement to the resulting reinforced material. This theory supports the finding that for a given solid to be cut into a minisolid to be combined with a body material, the cutting of a solid into a particular desired minisolid is advantageous over the cutting of the solid into particulates of any one uniform size.

Although the process of the present invention has only been carried out by cutting fibrous solids into minisolids, it has been conceived by the inventors of the process that any cuttable solid which is stronger than a body material may be used to reinforce that body material, so long as there is chemical and physical compatibility between the minisolid and the body material. Before examining any specific processes of the preferred embodiment of the present invention, a discussion of the cutting of fibrous solids into a minisolid, the mixing of the minisolid with a body material, and the relationship between the minisolid and the body material during mixing and subsequent processing, is in order.

As indicated above, in the practice of the process of the present invention, only fibrous solids have been cut into minisolids, although all cuttable solids may be cut into minisolids. The fibrous solids were cut substantially perpendicular to the length of the fiber, without the production of a fibrillated or ground product, so that the appearance of the cut minisolid was similar to staple fiber, but generally shorter than textile staple, depending upon the particular cutting process. The short and variable fiber lengths into which fibrous solids are cut is hereafter defined as "ministaple", the ministaple being a species of minisolid.

The cutting of solids for recycle of waste has been carried out by comminuting machines, the machines having blades mounted along the length of a drum-shaped rotor, these rotor blades adjusted into close proximity with stationary blades mounted parallel to the rotor blades. An example of this cutter type is shown in FIG. 1 of U.S. Pat. No. 3,813,048, and is also exemplified by Buss-Condux cutter CS 300/400-4. The comminutor used for recycle of waste is generally used to cut materials such as polymeric materials (e.g., the cutting of plastic and fibers is advertised in Buss-Condux literature on the CS 300/400-4 cutting machine) and also to cut paper and wood. The cut product is one which is in small enough pieces to easily redissolve, melt, resuspend, etc., depending upon the type of subsequent processing required. It has been found that cutters of this type produce particles having a significant particle size distribution, and it has unexpectedly been found that certain particle size distributions are especially suited to the production of reinforced products.

In the cutting of solids in machines as described above, the solid is fed down onto a horizontally rotating drum, the drum having longitudinally mounted blades thereon, so that the solid first encounters the blades upon the rotating drum. The solid is then forced to a point at which it is in the proximity of the point at which the longitudinal blades upon the drum come into close proximity with stationary blades, at which point the solid is cut into at least two particulates if it crosses the span between the stationary blades and the blades upon the drum. That part of the cut solid which is carried with the moving blades falls by gravity and air flow beneath the drum and encounters a screen installed under the drum. The particulate, if small enough and properly oriented, permeates the screen and is transported to a product storage area. If the particulate cannot penetrate the screen, it is eventually forced upward and goes through the cutting process at least twice more before encountering the screen again.

Acrylonitrile—containing fiber which has been cut into ministaple was either fed into the input chute of the Buss-Condux CS 300/400-4 in the form of continuous tow or as staple fiber. The continuous tow was the most preferred method, and the tow was fed by feed rollers. It was found that tow of 15 denier per filament having a total tow band denier of less than approximately 125,000 will cause a problem due to wrapping around the rotor, whereas tow bands of total denier from 500,000 to 1.3 million and above did not wrap around the rotor in the cutting process. It has also been found that the rate of feeding fiber into the machine may affect the average fiber length of the resulting ministaple all other factors (i.e. denier/filament, tow band denier, moisture, finish, screen size, airflow, etc.) being the same. In general, the higher the feed rate, the smaller the average fiber length produced. In the examples, the tow was always between 400,000 and 800,000 and the feed rate was approximately 4 pounds per minute for the CS 300/400-4 cutting machines. It is expected that larger capacity machines will scale accordingly. The rate of hand feeding of staple fiber lengths (e.g. 2",4",6", etc.) was not found to present problems in cutting due to a minimum feed rate threshold.

Different screens may be installed in the cutter in order to regulate the size of cut material emerging from the cutter, all other factors being the same. The use of a screen having small apertures results in a relatively small average fiber length while the use of a screen having large apertures results in relatively large average fiber length. Screens for the Buss-Condux Cutter CS 300/400-4 supra have been used in the cutting of acrylic fiber. Screens having square, round, and diamond shaped apertures have been used to regulate the product size. The apertures have ranged from 3 mm×3 mm squares to 24 mm×24 mm squares, from round holes having diameters from 3 mm to 7/32 inches, from diamond shaped holes (point to point) of 3/16 inches×5/16 inches to ⅜ inches×15/16 inches. When acrylic fiber between 3 and 66 denier per filament was cut into a ministaple, the cut particulates ranged from a maximum length of 1 inch to a minimum length of 0.005 inches. These ministaples ranged from an average fiber length as long as ¼ inches to as short in average fiber length as 0.04 inches. The cutting of fiber of lower denier produces longer average fiber length, all other cutting perameters remaining constant (e.g., screen aperture size, moisture content, air flow, etc.).

In the cutting of acrylic fiber, it has been found to be necessary to moisten the dry fiber to between 1% and 8% water owf (on weight of fiber), perferably 3% to 4%, in order to prevent the fiber from fusing during the cutting process. Textile staple (i.e. ½", 2", 4", and 6" staple lengths) and continuous tow have been cut into ministaple using Buss-Condux Cutter CS 300/400-4.

It is intended by this disclosure that the invention described herein is limited to an improved process of producing reinforced materials wherein the improvement comprises the cutting of solid materials into a variable sized solid which is used to make a reinforced material. The solid material must be cut, i.e. sheared between two lines of contact. For several reasons, it is advantageous (over other "non-cut" prior art products, as described below) to produce a cut product. It has been found that cutting increases the choices of both the cut of the material used and the choice of material to be cut, and it has also unexpectedly been found that a cut product has advantages over other "non-cut" solids used in the prior art.

Particulates which reinforce materials used in the prior art include asbestos, cotton linters, wood pulp, and pulped Kevlar ®. In each of these examples, a particle size distribution was obtained, with particles of various size being mixed with a body material to form a reinforced material. However, in none of these cases was the reinforcing material cut. Kevlar and wood pulp are pulped products, asbestos is broken into particulates when being extracted from its natural surroundings, and cotton linters are separated from seeds and screened to remove fine particulates. Fibrous products which are fibrillated, such as wood pulp and pulped Kevlar, are not considered to be equivalents for the present invention, as fibrillated materials do not exhibit the degree of "openness" shown by the ministaple of the present invention. This lack of openness is conceived to hinder the mixing of the fibrillated particulates with a body material, and necessitates the use of relatively smaller particulates, which in turn relatively decreases the degree of reinforcement of a body material. Compared to fibrillated products, relatively larger particles of minisolids (and ministaples) may be mixed into a body material, the relatively larger particles giving the resulting finished material a greater degree of reinforcement. The processing of asbestos and cotton linters produces very fine particulates which must be removed by screening in order to obtain a particle size distribution similar to ministaple. These very fine particulates are not desired in reinforced materials as not only are these "fines" not participating in the reinforcement of the body material into which they are incorporated, but furthermore they are not necessary to improve the mixing (fines may hinder mixing, as very fine particulates are not conceived to "open-up" as much as larger particulates, and may therefore form lumps).

The following description of the production of acrylonitrile—containing fibers is not intended to limit the scope of the improvement disclosed herein. The improvement in the method of making reinforced materials is conceived to be useful when producing any reinforced material in which a cuttable solid which is stronger than a body material is mixed with that body material. The following description of acrylonitrile—containing fiber is illustrative of the examples, but it is conceived that man-made and natural fibers as well as cuttable solids would be suitable for carrying out the disclosed improvement in the method of producing reinforced materials.

The acrylonitrile—containing ministaple fiber used in the examples is produced by first preparing the desired acrylonitrile—containing polymer. Although the chosen monomer or comonomer mixture may be polymerized employing suspension, emulsion, or solution polymerization techniques, suspension procedures are the most widely used commercially. Herein the monomer(s), in the form of small globules dispersed by agitation throughout an aqueous solution of a catalyst are polymerized at suitable temperatures. Commonly employed catalysts are water soluble compounds such as hydrogen peroxide, per salts such as ammonium or alkali metal persulfates, and redox catalysts such as a persulfate and a bisulfite, at a concentration ranging from about 0.1 to 5% of the total monomers present. The monomer suspension containing the catalyst is held at a temperature between about 30° and 70° C. to form the polymer, which is insoluble in the aqueous medium in which the polymerization proceeds. The solid polymer is filtered from the aqueous reaction medium and washed to remove any impurities present. A practical procedure for such a polymerization is found in U.S. Pat. No. 2,847,405.

Preparation of fibers from the solid acrylonitrile—containing polymer is accomplished by various methods known in the art, the most common of which employ the "wet spinning" or "dry spinning" techniques. In wet spinning, a solution of the polymer (in a suitable organic or inorganic solvent) is first de-gassed and filtered, after which it is "spun" or forced through multipleholed jets into a coagulating bath, where the polymer is precipitated. The filaments so produced are washed (generally counter-currently with water) to remove the spinning solvent, and are then drawn and finally dried. Examples of the wet spinning of acrylonitrile—containing fibers from solutions of acrylonitrile—containing polymers in inorganic solvents are found in U.S. Pat. No. 2,916,348 and 2,558,730; the employment of organic solvents is shown in Knudsen, Textile Research Journal 33, 13–20 (1963).

The draw referred to above, which serves to improve the physical properties of the fibers by orienting the molecules of which they are composed, is usually carried out at temperatures between about 40° and 100° C. The actual degree of draw is dependent upon chemical composition, previous processing, and desired ultimate physical properties of the fibers. This draw may be accomplished in a single stage or distributed between multiple stages.

It is believed that the amount of draw or total stretch applied to the fiber tow (after spinning) to enhance molecular orientation may have an effect on the process of the present invention. It is felt that a product having a decreased elastic recovery produced by reducing the amount of draw subsequent to spinning may be beneficial in mixing and/or processing of ministaple. In the wet spinning of acrylic fibers, the total draw ratio after spinning may range from as low as $2\times$ (two times) to as high as $25\times$, depending upon the fiber properties desired. A narrower range from $6\times$ to $15\times$ is more commonly employed in industry. The selection of the total draw ratio is certainly dependent upon fiber denier, composition and temperatures employed. It is believed that the most preferred range of draw ratio is from about $4\times$ to about $12\times$ for the acrylonitrile—containing ministaple fiber useful in the present invention. The resulting fiber has a range of tenacity from 1 to 6 grams/denier, a more preferred range of from 2.0 to 4.5 grams/denier, and a most preferred tenacity of 3.6 grams/denier. This fiber also has an elongation of break of from 15 to 60%, a more preferred range at from 30 to 55%, and a most preferred elongation at break of 52%.

The process of drawing is followed by that of drying which is carried out while the fibers are under tension or in a relaxed or partially relaxed condition.

Acrylonitrile—containing fiber manufacturing processes of today also include crimping, cutting to any one of a number of desired staple lengths, and packaging. Crimping is ordinarily carried out by the stuffing box principle. Apparatus like that described in U.S. Pat. No. 2,575,839 is commonly employed. Crimping may be effected on stretched wet gel tow before drying (U.S. Pat. No. 2,917,784) if desired. Cutting and packaging of acrylonitrile—containing fibers are carried out with well-known equipment and by well-known procedures which are standard in the synthetic fiber industry.

Cutters capable of making a minisolid include: Buss-Condux cutters manufactured by Condux-Werk of Hanon, West Germany, cutters manufactured by Nelmar Co., Inc. of North Uxbridge, Mass.; cutters manufactured by Sprout-Waldron of Muncy, Pa.; cutters manufactured by Cumberland-Lessonia of Providence, R.I.; Stokes cutters and Wiley Mills. The particular cutting machine used to produce the ministaple product in the examples below was a Buss-Condux CS 300/400-4.

It has been found that the Buss-Condux CS 300/400-4 cutting machine operates most efficiently with a suction fan rate between 30 and 40 cubic meters of air per minute (in order to move the cut fiber and separate it from the air).

In addition to a 3–4% owf moisture level being applied to the fiber before cutting (supra), it has been found that the presence of a small amount of finish applied to the fiber is beneficial to the cutting efficiency and to the quality of the product. If no finish is present upon moist (3%–4% moisture owf) homopolymer acrylic fiber, the fiber will form a relatively small amount of oxidized chunks of fused solids within the cutter, the fused solids coming out with the product. The presence of finish gives increased fiber to metal lubricity and aids fiber openness. The amount of finish upon the fiber may range from 0.05% owf to 2% owf. Finishes which may be used in the cutting process include water soluble finishes known to the textile trade, for example, polyethyleneglycol (400) monolaurate. In addition to moisture and finish upon the fiber, it has been found that uncrimped fiber has a greater degree of openness than crimped fiber. The higher degree of openness of uncrimped fiber is thought to be analogous to the higher degree of openness of cut fiber as opposed to pulped (or fibrillated) fiber.

It has been unexpectedly found that the denier of the fiber which is cut into a ministaple affects the degree of mixing of the fiber with a body material. Ministaple fibers having deniers which are considerably larger than deniers used for apparel fibers have been found to be more easily dispersed than apparel denier fibers. For example, 1 to 6 denier ministaple fiber does not disperse as well as 18–25 denier fiber. It has also been found that deniers greater than 60 are not as suitable as deniers between 18 and 25. Furthermore, the degree to which a fiber is drawn in processing may affect dispersion. For example, with respect to fibers of equivalent denier, those fibers having a lower draw ratio may facilitate dispersion to a higher degree than those fibers having a higher draw ratio.

In assessing a particular mixture of body material and ministaple, several factors must be considered in order to determine the best ministaple for that application. The most important consideration in producing a highly reinforced material is to achieve a uniform mix having enough longer fibers therein so that the mix will be strong after it is processed and treated. A uniform mix is considered to be a mix which has well-dispersed fiber therein, without clumping together or "roping" (i.e. yarn formation) of the fiber in the mix or in subsequent processing. By definition, the fiber within the mix is generally stronger than the body material so that the strongest product is one which has a maximum amount of fiber therein without sacrificing so much uniformity within the mix that the mix will fail to maintain its integrity (i.e. fall apart). The particular fiber length distribution which is chosen should have fibers which are at a length which, if any longer, would cause an undesirable loss of uniformity of the resulting mix. In considering other factors such as surface smoothness and density of the resulting product, one must consider the statement made above, that is, by shifting the fiber length distribution downward in length, the resulting ministaple has a relatively greater mixing potential and a relatively lower reinforcing potential, and vice-versa.

Particular ministaples have been characterized by the following Rotap analysis. In a Rotap analysis, a specific weight of ministaple was placed upon the top screen of a Tyler Rotap Testing Sieve Shaker Model B and the machine was allowed to rotate and tap the screens and the ministaple for a set length of time and at a set frequency. The results of this test were relatively consistent, and the fiber length distribution has been found to be monomodal. In particular, 50* grams of ministaple was placed in a Tyler Rotap Testing Sieve Shaker Model B upon a Tyler #4 screen.

*50 grams of ministaple was generally used for deniers above 17 while 25 grams was generally used for deniers below 17. Beneath the Tyler #4 screen was installed a Tyler #14 screen, followed by a Tyler #35 screen, followed by a Tyler #80, followed by a Tyler #200 screen, followed by a Tyler #325 screen, with a pan (to catch all of the remainder) below this last screen. The Tyler Rotap Shaker was allowed to operate for 10 minutes. The screens were then removed and the weight of the contents of each screen was determined. It was found necessary to spray the ministaple with an anti-static agent before testing, as the effective classification of the staple was hindered by static charge. Results of several Rotap analyses of ministaple used in a specific process is shown in examples below.

The first eight examples below are intended to illustrate cutting processes, the first four of which illustrate the art (Examples II, III and IV were as short as we could get the tow cut, when a uniform length staple was desired) of cutting uniform staple to a specific short length and the latter four examples (Examples V–VIII) are to illustrate the process of cutting a fiber into a ministaple.

Solids which may be cut into minisolids are conceived to encompass the group of all cuttable solids. Some of the compositions of these solids include: nylon, polyester, acrylonitrile—containing polymers, addition polymers, condensation polymers, glass, rubber, leather, paper, polyolefins, saran, and hair, among many other solids. A cuttable solid having molecular orientation is chosen for the preferred embodiment of the present invention, as materials having molecular orientation result in reinforced materials with higher tensile strength than reinforced materials incorporating that same reinforcing solid in which the reinforcing solid does not have molecular orientation.

The characteristics of the body material are highly variable. Examples of body materials include, among many others: plastics, rubbers, paints, cement, tar, petroleum residues, polymeric materials, and paper.

The mixing of minisolids with body materials may be carried out in a variety of ways. The body material must be put into a mixable form, e.g. granulated so that a dry solid mixture can be made; dissolved so that the minisolid may be mixed with a solution from which the solvent may later be driven off; melted so that the solid minisolid is blended into a melt; etc. A wet or dry mix may be made, and the minisolid must (for the most part) retain its reinforcing characteristics in both the mixing and the processing stages, e.g. it cannot dissolve, melt or be further broken up during either the mixing process or in subsequent processing such as calendaring, curing, cooling, drying, etc.

It is conceived that the mixing of ministaple with a body material may be carried out by many mixers known in the prior art. Included are ribbon blenders, vertical or horizontal blenders, Koneaders, helical mixers, sigma mixers, Banbury mixers, two roll mills, single and twin screw extruder mixers, Patterson-Kelley blenders, Waring Blendors, rolling drum blenders, and other blenders known to the field. As known by those of skill in the art, in many cases where the body material is a highly viscous liquid or a putty-like solid, blending must be carried out for as long as one hour, or more. In any case, the mixing process must be carried out to the point where the mixture is uniform, as stated above.

In the manufacture of a reinforced high density sheet material to be used as a gasket, a putty-like mix is applied to the nip of a standard two roll sheeting machine, for example, a Troester maching having hot and cold rolls. The mix is put into the nip (the region where the cylinders are closest to one another) between the rolls, with the distance between the rolls and the pressure between the rolls being controlled. The mix is applied across the nip so that the mix is spread evenly across the nip. The mix adheres to the hot roll, producing reinforced material in the shape of an open-ended tube, the tube having an inside diameter identical to the diameter of the hot roll of the Troester machine. Heat and pressure are used to cure the reinforced material while it is on the roll. The material is then removed from the roll by cutting the tube along its length, so that a rectangular piece of reinforced material results.

In the manufacturing of fiber reinforced high density gasketing material using a two roll sheeting machine, different compositions for a starter layer, a body layer, and a finish layer are utilized to produce a gasket. This is, separate layers are built upon the hot roll in order to obtain the desired reinforced material.

A starter mix, which forms a starter layer, is used to get material to adhere to the surface of the hot roll. The body mix, inserted into the nip of the rollers next, forms the body layer atop the starter layer. The body layer comprises the majority of the material in the finished product, and contains the greatest amount of reinforcing agent. The finish layer provides a smooth surface atop the body layer. The finish layer is thin and is generally used for cosmetic purposes. The composition of the the starter layer mix and the finish layer mix may be the same.

The following description is intended as a generalized discussion of the production of high density gasketing material which incorporates a ministaple in its formulation. This description is repeatedly referred to in Examples IX–XX which follow.

A starter layer mix composition may be prepared by mixing 10 pounds of natural rubber and 7 gallons of toluene for 30 minutes. Thereafter, to this mixture is added 0.5 pounds of zinc oxide as activator, 0.1 pounds of sulfur as vulcanizer, 0.05 pounds of benzothiazyl disulfide as accelerator, 0.1 pounds of 2,2-methylene-bis 4-methyl-6t-butyl phenol as antioxidant, 0.2 pounds of Stantone (a trademark) 4005 Blue as Colorant, (available from the Harwick Chemical Corporation of Akron, Ohio); and 30 pounds of calcium metasilicate as filler. The reaction mixture is stirred for 15 minutes. Thereafter, 30 pounds of clay is added to the mixture, and the mixture is stirred for an additional 45 minutes.

A body layer mix composition is prepared by mixing 70 pounds of Hycar (a trademark) 1492P80 acrylonitrile-butadiene copolymer (available from the B. F. Goodrich Company of Cleveland, Ohio), 18 pounds of Ameripol (a trademark) 1012 styrene-butadiene copolymer (available from the Goodrich Chemical Company of Cleveland, Ohio) 12 pounds of natural rubber, and 30 gallons of toluene for 15 minutes. Thereafter, 400 pounds of clay filler, 1.5 pounds of tetramethylthiuramdisulfide as accelerator, 5.0 pounds of zinc oxide as activator, 3.0 pounds of sulfur as vulcanizer, 1.0 pound of 2-mercaptobenzothiazole as accelerator, 1.0 pound of Stantone 4005 Blue Colorant, 0.2 pounds of SRF black colorant, and 1.0 pound of AgeRite Resin D (a polymerized 1,2-dihydro-2,2,4-trimethylquinoline antioxidant which is available from the R. T. Vanderbilt Company of Norwalk, Connecticut) are added to the reaction mixture, and the mixture is then stirred for 15 minutes. One hundred and twenty-five pounds of the acrylonitrile—containing ministaple fiber is then added to the reaction mixture, and the reaction mixture is then stirred for 15 minutes. Then 10 gallons of toluene is added to the reaction mixture, and the mixture is stirred for an additional 60 minutes.

A finish layer mix composition is prepared by mixing 8 pounds of Hycar 1092P80 acrylonitrile-butadiene copolymer and 2 pounds of Ameripol 1012 styrene-butadiene copolymer for 5 minutes. Five gallons of toluene is added to the reaction mixture, and the reaction mixture is then stirred for 25 minutes. Then to this reaction mixture are added 0.5 pounds of zinc oxide as activator, 0.2 pounds of sulfur as vulcanizer, 0.1 pound of tetramethylthiuramdisulfide as accelerator, 0.2 pounds of AgeRite Resin D. as antioxidant, 20 pounds of barium sulfate as filler, 0.14 pounds of Stantone 4006 Blue Colorant, and the mixture is stirred for 15 minutes. Thirty pounds of clay as filler is added to the reaction mixture and the mixture is then stirred for an additional 45 minutes.

The gasket sheet is prepared on a Troester sheeter model KD-IT 30/15, which is manufactured by the Troester Company of Hannover, Wulfel, West Germany. The roll temperature is set at from about 230–240 degrees Fahrenheit; the speed on the meter gauge is set from about 30 to about 35 meters per minute; and the pressure gauge is set at 1013 kN (kilonewtons)×10. A sufficient amount of the starter composition of this example is added to the Troester sheeter to completely cover the roll. Toluene and other volatiles are evaporated during processing. When the roll is coated, the pressure gauge is reset to above 5–6 kN×10, and the body composition of this example is then added to the Troester sheeter; when the hot roll of the Troester begins picking up the body composition coating, the speed on the meter gauge is reset to 20 meters per minute. After the thickness of the sheet on the Troester reaches about 0.061 inch, the finish composition is coated onto the sheet until the total thickness of the sheet is about 0.063 inch. Thereafter, the sheet is removed from the Troester. Other sheet thicknesses such as 1/32 inch and ⅛ inch may be used.

The gasket was analyzed by tensile strength tests in which an "average tensile strength" value was determined by cutting sample strips of gasket material parallel to and perpendicular to the line of contact (of the rollers of the Troester machine) upon the gasket sheet. That axis which is perpendicular to the line of contact is known as the "machine direction"; that axis which is parallel to the line of contact is herein designated as the "anti-machine" direction. The ratio of the tensile strength in machine direction to the tensile strength in anti-machine direction was typically about 3:1 for the gasket sheet. Taking an example, for a ratio of 3:1 and an average tensile of 2400 psi, the machine direction tensile was 3600 psi while the anti-machine direction was 1200 psi. The orientation of the ministaple fiber during processing by the rollers causes some orientation of the fibers which results in greater strength along one axis while producing a lower strength along the other axis.

EXAMPLE I

A tow of homopolymer acrylic fiber, 3 denier per filament, was cut (by a proprietary process) into 0.250 inch staple of relatively uniform length. The cutting process was carried out by Minifibers, Inc. of Weber City, Virginia. The tow of homopolymer acrylic fiber had a water soluble textile finish applied to a level of 0.1% on the weight of fiber.

EXAMPLE II

A tow of homopolymer acrylic fiber, 3 denier per filament, was cut into uniform staple of 0.135" by Minifibers, as in Example I above.

EXAMPLE III

A tow of homopolymer acrylic fiber, 6 denier per filament, was cut into 0.135" staple by Minifibers, as in Example I above.

EXAMPLE IV

A tow of homopolymer acrylic fiber, 15 denier per filament, was cut into 0.135" uniform staple by Minifibers, as in Example I above.

EXAMPLE V

A tow of homopolymer acrylic fiber having a total denier of approximately 700,000 (21 denier per filament) was cut into a ministaple using a Buss-Condux CS 300/400-4 cutting machine. In the production of the tow, a water soluble finish (at a level of 0.1% on the weight of fiber) was applied to the fiber by padding the finish before drying the fiber in order to reduce the fiber to metal friction. The finish remained on the fiber subsequent to production. The tow was run through a fog box immediately prior to the cutting process, so that the tow acquired approximately 4% moisture by weight, the water remaining on the fiber surface. The Buss-Condux cutting machine was fed 240 lbs./hr. of the homopolyer acrylic tow. The cutter had a 3 mm×3 mm screen installed in order to regulate the product size. The airflow through the cutting machine was approximately 38 cubic meters per minute. The average staple length was 0.065" as measured by Rotap analysis and direct measurement.

EXAMPLE VI

A tow of homopolymer acrylic fiber having a total denier of approximately 700,000 (21 denier per filament) was cut into a ministaple using a Buss-Condux CS 300/400-4 cutting machine. The tow had finish and water applied as in Example 1. The Buss-Condux cutting machine, model CS 300/400-4 was fed 150 lbs. of fiber per hour. The cutter was equipped with an 8 mm×8 mm screen in order to regulate the product size. The airflow through the cutting machine was approximately 20 cubic meters per minute. The average staple length was 0.063" as measured by Rotap analysis and direct measurement.

EXAMPLE VII

A tow of homopolymer acrylic fiber having a total denier of approximately 425,000 was cut into ministaple on a Buss-Condux CS 300/400-4 cutting machine. The acrylic fiber was 21 denier per filament. A water soluble finish was applied (before drying) by a padding process, the finish being applied to 0.1% owf. The Buss-Condux machine was fitted with a screen having 3 mm×3 mm apertures. The cutting machine was fed 150 lbs/hr of fiber. The airflow through the machine was maintained at 38 m³/min. The ministaple product was evaluated by Rotap analysis, giving the following data:

| Screen (Tyler #) | % of total sample wt. |
| --- | --- |
| 4 | 0.01 |
| 14 | 0.05 |
| 35 | 2.47 |
| 80 | 35.63 |
| 200 | 51.94 |
| 325 | 8.09 |
| Pan | 1.00 |

EXAMPLE VIII

A tow of homopolymer acrylic fiber having a total denier of approximately 700,000, 21 denier per filament, was cut into ministaple on a Buss-Condux CS 300/400-4 cutting machine. Water and water soluble finishes were applied simultaneously in a fog box, the water being approximately 4% owf and the finish being applied to approximately 0.1% owf. The Buss-Condux machine was fitted with a screen having square apertures 8 mm×8 mm. The cutting machine was fed 240 lbs/hr of fiber. The ministaple produced was evaluated by Rotap analysis and it was found that the Tyler Screen #4 typically retained 0.56% of the sample by weight, a Tyler #14 retained 0.14%, a Tyler #35 retained 10.92%, a Tyler #80 retained 27.68% by weight, a Tyler #200 retained 45.54%, a Tyler #325 retained 13.80%, and the pan retained 0.50% by weight.

EXAMPLE IX

Dry homopolymer acrylic fiber tow having an average denier per filament of 15.2; 0.1% (on the weight of fiber) of a water soluble finish; 3% crimp (crimp was intentionally omitted, approximately 3% crimp results from normal processing conditions); and a "dry" fiber moisture content of about 1.5% water was shipped to Minifibers, Inc. of Weber City, Virginia. The homopolymer acrylic fiber, sent in tow form, was cut into a uniform staple length of 0.250"±1%.

This product was used in a gasket making process, the uniform 0.250" staple being used to make a mix which was to be used as a body layer in a high density reinforced gasketing material. The mix was made by the generalized process described supra except that 0.250" uniform staple was substituted for ministaple. Once formulated, the resulting mix looked chunky and non-uniformly dispersed. Fibers were observed to be much longer than 0.250" from end to end, as some fibers appeared to be at least as long as 1". After a starter layer (supra) was successfully applied to a two roll sheeting machine, the body material mix was placed in the nip of the rolls, but instead of a smooth layer being applied, clumping was soon noted. After clumping, holes formed in the sheet and from the holes long slits were ripped into the sheet. No finish coat was applied, as the sheet was considered unsatisfactory.

EXAMPLE X

Dry homopolymer acrylic fiber tow, as in Example IX was sent to Minifibers, Inc. of Weber City, Virginia, and was cut to 0.135", the shortest staple which Minifibers could cut. Minifibers, Inc. is industry specialist in cutting short staple lengths. Minifibers reported that 0.135" was as short as they could cut staple, and they also reported that the 0.135" product had fiber lengths ranging from 0.125" to 0.145".

The 0.135" cut fiber was used to make a mix, as described in Example IX (except that 0.135" uniform staple was substituted), which was to be a body layer in a high density reinforced gasket product. This mix appeared somewhat more uniform than the mix of Example IX, but long fibers from point to point were observed (apparently the 0.250" and 0.135" cut fiber would string together in the mixing process, forming a yarn inside of the mix). In the sheeting process, the mix containing 0.135" staple was somewhat more evenly dispersed, but in general performed similarly to the 0.250" staple—i.e. an acceptable sheet could not be formed.

EXAMPLE XI

A tow of homopolymer acrylic fiber, having a total denier of 700,000 and an average denier per filament of 21, the filaments having 3% crimp and approximately 80% of normal textile draw, and having 0.1% (on the weight of fiber) of a water soluble textile finish thereon, had moisture applied to the fiber by means of a typical fog box application, the resulting moisture level (on the weight of fiber) being approximately 4%. After moistening the fiber, the fiber was fed into the input chute of a Buss-Condux CS-300/400-4 cutting machine at a rate of 4.0 lbs./minute. The Buss-Condux machine was fitted with a screen having diamond shaped holes, the holes being 15/16"×5/16" (point to point) and an open area of 67%. The ministaple produced was analyzed by the Rotap screening method, and the results were:

| Screen (Tyler #) | % of total sample wt. |
|---|---|
| 4 | 23.33 |
| 14 | 8.75 |
| 35 | 13.04 |
| 80 | 19.01 |
| 200 | 28.09 |
| 325 | 7.21 |
| Pan | 0.25 |

The ministaple product was used to produce a body layer mix by the general procedure disclosed supra. The mix was used to produce a high density reinforced gasketing material upon a two roll sheeter, as described supra. The body layer mix was found to form a sheet, and the strength properties of the sheet were found to be fair. The fiber to rubber weight ratio, at highest, was approximately 1.0. Compared with acceptable strength levels for high density gasket material, the product was very low in tensile strength, and the fiber content of the product was less than desired.

EXAMPLE XII

A tow of homopolymer acrylic fiber, having an average denier per filament of 21, the filaments having 3% crimp and approximately 80% of normal textile draw, and having 0.1% (on the weight of fiber) of a water soluble textile finish thereon, had moisture applied to the fiber by means of a typical fog box application, the resulting moisture level (on the weight of fiber) being approximately 4%. After moistening the fiber, the fiber was fed into the input chute of a Buss-Condux CS-300/400-4 cutting machine at a rate of 4.0 lbs./minute. The Buss-Condux cutting machine was fitted with a screen having square shaped holes, the holes being 3 mm×3 mm in size and an open area of 31.5%. The ministaple produced was analyzed by Rotap screen analysis (supra) and was found to yield the following results:

| Screen (Tyler #) | % of total sample wt. |
|---|---|
| 4 | .01 |
| 14 | .05 |
| 35 | 2.47 |
| 80 | 35.63 |
| 200 | 51.94 |
| 325 | 8.09 |
| Pan | 1.00 |

The ministaple product was used to produce a body layer mix by the general procedure described supra. The mix was used to produce a high density reinforced gasketing material upon a two roll sheeter, as described supra. The body layer mix was utilized in accordance with the general procedure. The mix was added atop a starter coat and was found to form a sheet, with the maximum ratio of fiber to rubber being approximately 3.0. The tensile strength of the resulting product was considered to be adequate.

EXAMPLE XIII

A tow of homopolymer acrylic fiber, having an average denier per filament of 21, the filaments having 3% crimp and approximately 80% of the normal textile draw and having 0.1% (on the weight of fiber) of a water soluble finish thereon, had moisture applied to the fiber by means of a typical fog box application, the resulting moisture level (on the weight of fiber) being approximately 4%. After moistening the fiber, the fiber was fed into the input chute of a Buss-Condux CS 300/400-4 cutting machine at a rate of 4.0 lbs./minute. The Buss-Condux machine was fitted with a screen having round shaped holes, having a diameter of 3/16" and an open area of 32.5%. The ministaple produced was analyzed by Rotap screen analysis (supra) and was found to yield the following results:

| Screen (Tyler #) | % of total sample wt. |
|---|---|
| 4 | .00 |
| 14 | .22 |
| 35 | 13.88 |
| 80 | 34.57 |
| 200 | 41.92 |
| 325 | 8.36 |
| Pan | 0.55 |

The ministaple product was used to produce a body layer mix by the general procedure described supra. The mix was used to produce a high density reinforced gasket material upon a two roll sheeter, as described supra. The body layer mix was utilized in accordance with the generalized procedure outlined supra. The mix was added atop a starter coat and was found to form a sheet, with a maximum fiber to rubber ratio of approximately 2. The tensile strength of the resulting product was found to have greater than 2400 psi average, a superior tensile strength level.

EXAMPLE XIV

A tow of copolymer acrylic fiber, produced in accordance with the general method described supra, contained approximately 90% acrylonitrile, approximately 8 to 9% methyl acrylate, and approximately 1% other material. The tow had no finish applied to the fiber, but approximately 4% moisture (on the weight of fiber) was applied to the tow by means of a typical fog box application. The fiber in the tow was approximately 21 denier/filament, and had about 3% crimp, and was drawn only 80% of the amount of draw applied to the same tow when the fiber was to be used for normal textile applications. The moist tow was then fed into the input chute of a Buss-Condux CS-300/400-4 machine. The Buss-Condux cutting machine was equipped with a screen having round holes of 3/16" diameter and an open area of approximately 32.5%. The ministaple produced had a relatively small amount of oxidized acrylic chip which was removed by screening the product to separate the chip from the ministaple. The resulting ministaple was analyzed by Rotap analysis and yielded the following results:

| Screen (Tyler #) | % of total sample wt. |
|---|---|
| 4 | .53 |
| 14 | .23 |
| 35 | 9.74 |
| 80 | 28.30 |
| 200 | 45.41 |
| 325 | 14.41 |
| Pan | .25 |

The above described ministaple was used to produce a high density gasket sheet by the method outlined supra. The tensile strength (average value) was approximately 8% lower than the gasket sheet made by Example XIII, and the maximum pressure the sheet could endure was approximately 10% less than the maximum rupture pressure tolerated by the sheet of Example XIII.

EXAMPLE XV

A tow of copolymer acrylic fiber, produced in accordance with the general method outlined supra contained approximately 86% acrylonitrile, approximately 8-9% methyl acrylate, approximately 4-5% vinyl bromide, and approximately 1% other material. The filaments within the tow were of an approximate average denier of 21, and had 3% crimp, and was drawn only 80% of the draw applied to the same tow when the product was used for textile applications. The tow was cut into ministaple exactly as in Example XIV and the chips were removed. Rotap analysis upon the ministaple yielded the following results:

| Screen (Tyler #) | % of sample wt. |
|---|---|
| 4 | .32 |
| 14 | .85 |
| 35 | 23.51 |
| 80 | 36.27 |
| 200 | 29.63 |
| 325 | 8.73 |
| Pan | .22 |

The above described ministaple was used to produce a high density gasket sheet as in Example XIV. The tensile strength (average value) was approximately 4% lower than the gasket sheet made by Example XIII, while the maximum rupture pressure the sheet could tolerate was approximately the same as the sheet produced in Example XIII.

EXAMPLE XVI

A tow of modacrylic fiber, produced in accordance with the general method outlined supra, contained approximately 83-84% acrylonitrile, approximately 10-11% methyl acrylate, approximately 4-5% vinyl bromide, and approximately 1% other material. The filaments within the tow were of an approximate average denier of 21, and had about 3% crimp, and was drawn only 80% of the draw applied to the same tow when the product was used for textile applications. The tow was cut into ministaple exactly as in Example XIV, and the chips were removed. Rotap analysis upon the ministaple yielded the following results:

| Screen (Tyler #) | % of sample wt. |
|---|---|
| 4 | .11 |
| 14 | 1.52 |
| 35 | 23.45 |
| 80 | 38.37 |
| 200 | 27.87 |
| 325 | 7.47 |
| Pan | .07 |

The ministaple was used to produce a high density gasket sheet as described in Example XIV. The tensile strength (average value) was approximately 2% greater than the tensile strength of the sheet produced in Example XIII while the maximum rupture pressure the sheet could tolerate was about 50% lower than the maximum pressure tolerated by the sheet of Example XIII.

EXAMPLE XVII

A tow of homopolymer acrylic fiber, 21 denier per filament, was cut in a Buss-Condux CS 300/400-4 cutting machine. Before cutting, the tow had 0.1% (on the weight of fiber) of a water soluble textile finish applied, and had 3-4% (on the weight of fiber) of moisture applied to the surface of the fiber by means of a conventional fog box. The fiber was not intentionally crimped and was drawn to 80% of normal. The Buss-Condux cutting machine was equipped with a screen having square apertures having dimensions of 8 mm×8 mm. The airflow rate was about 20M$^3$/min. The tow was fed into the input chute of the machine at 240 lbs/hr., the tow having a total denier of approximately 700,000. The average fiber length of this ministaple was approximately 1/16" and the fiber length distribution was determined by Rotap analysis as described above. Rotap analysis revealed:

| Screen (Tyler #) | % of total sample wt. |
|---|---|
| 4 | .00 |
| 14 | .22 |
| 35 | 14.90 |
| 80 | 26.39 |
| 200 | 45.24 |
| 325 | 10.89 |
| Pan | .18 |

A 21 gram sample of the ministaple described above was added to 400 gm. of coal tar, and the mixture was stirred by hand for 5-10 minutes (stirring was simply performed with a glass rod).

As a control, 21 grams of dry asbestos (Johns Manville Company grade 7MF5) was mixed with 400 grams of coal tar, the stirring occurring for 5-10 minutes, utilizing a glass rod.

Three samples were applied to adjacent surfaces of used asphalt paving which had various sized cracks. A paint brush was used to provide an even coating. The ministaple-coal tar mix and the asbestos-coal tar mix were applied to the surface of the asphalt, and remained intact initially. A sample of pure coal tar was also applied to the asphalt, and it ran down a slight incline where the other two samples did not.

Three days later, the surface was opened to traffic. The ministaple-coal tar sample held up as well, if not better, than the asbestos-coal tar sample, while the sample containing only coal tar soon wore away.

EXAMPLE XVIII

A tow of homopolymer acrylic fiber similar to the tow used in Example XVII was cut into ministaple by the same process as described in Example XVII. The ministaple, analyzed by Rotap analysis, yielded the following results:

| Screen (Tyler #) | % of total sample wt. |
|---|---|
| 4 | .03 |
| 14 | .21 |
| 35 | 11.75 |
| 80 | 35.60 |
| 200 | 43.03 |
| 325 | 8.42 |
| Pan | .29 |

Two aliquots of the ministaple produced above were taken. A first sample was made by taking the first aliquot and combining it with 99 times its weight of Quikrete (a trademark) concrete mix. A second sample was made by taking the second aliquot and combining it with 9 times its weight of Quikrete concrete mix. Water was added to the first mix (1% ministaple) as directed based only on the concrete. Twice as much water per weight unit of concrete was added to the second sample (10% ministaple). A third sample of 100% concrete was mixed with the same proportion of water per weight concrete as in the first sample, the third sample being used as a control.

The wet mixes were used to form blocks 3"×3"×1" in size. The blocks, after setting, were placed in air for about 2 weeks to cure further.

After 2 weeks, the blocks were repeatedly dropped from a height of 6 feet onto concrete pavement. The 10% ministaple sample broke apart readily. The 100% concrete sample had corners chipped off or broken off. The 1% ministaple concrete sample retained its initial shape and structure by visual examination and was considered to be reinforced.

EXAMPLE XIX

A tow of homopolymer acrylic fiber, produced in accordance with the general method outlined supra, was cut into a ministaple on a Buss-Condux CS 300/400-4 cutting machine. The filaments within the tow were of an average approximate denier of 15.2, and had about 3% crimp, and the filaments were drawn 100% of the draw applied to the same tow when the product was used for textile applications. The tow contained 0.1% owf of a water soluble textile finish and approximately 4% moisture owf applied by typical fog box method. The tow was fed into the input chute of the Buss-Condux cutting machine, the cutting machine being equipped with a screen which had square shaped apertures which were 4 mm×4 mm in size, the screen having approximately 34% open area. The airflow through the machine was approximately 38 m $^3$/min.

The ministaple was used to produce a high density gasket sheet as described in Example XIII. The sheet produced was entirely satisfactory.

EXAMPLE XX

The same ministaple used in Example XVIII was used to reinforce latex paint. Five samples were prepared using latex (Enterprise, Interior One Coat Latex Flat Wall Paint Nonyellowing White L758B) wall paint. The samples contained 1, 2, 4, 6, and and 10% of ministaple, based upon total sample weight. One coat of each sample was applied to a clean and untreated plywood surface, except for the 10% ministaple sample, which was too thick to apply. After drying for three days, the following results were observed:

| at % ministaple | observations |
|---|---|
| 1% | traces of fibers in paint (undesirable) |
| 2% | traces of fibers in paint (undesirable) |
| 4% | textured surface (reinforced) |
| 6% | textured surface (reinforced) |

The 1%, 2%, 4% and 6% ministaple/paint mixtures are shown to yield a reinforced painted surface due to the incorporation of the relatively strong acrylic ministaple fiber, as shown by wet and dry abrasion resistance tests.

We claim:

1. Solid, fiber-containing products manufactured with concrete, characterized in that they contain homopolymer acrylic fibers.

2. Solid, fiber-containing products manufactured with cement, characterized in that they contain homopolymer acrylic fibers.

3. A product according to claim 1, characterized in that the fibers have a non-uniform length range of up to one inch.

4. A product according to claim 2, characterized in that the fibers have a non-uniform length range of up to one inch.

5. A product according to claim 1, characterized in that the fibers have a denier of 3 to 66.

6. A product according to claim 2, characterized in that the fibers have a denier of 3 to 66.

7. A method for the manufacture of the products according to claim 1, characterized in that the concrete is mixed together with water, the usual supplemental and additive materials and with homopolymer acrylic fibers as reinforcing fibers, and brought into the desired shape and allowed to set.

8. A method for the manufacture of the products according to claim 2, characterized in that the concrete is mixed together with water, the usual supplemental and additive materials and with homopolymer acrylic fibers as reinforcing fibers, and brought into the desired shape and allowed to set.

9. A method for the manufacture of the products according to claim 7, characterized in that the fibers have a non-uniform range of up to one inch.

10. A method according to claim 8, characterized in that the fibers have a non-uniform length range of up to one inch.

11. A method according to claim 7, characterized in that the fibers are stretched multiple-times.

12. A method according to claim 8, characterized in that the fibers are stretched multiple-times.

* * * * *

UNITED STATES PATENT AND TRADEMARK OFFICE
CERTIFICATE OF CORRECTION

PATENT NO.   : 4,866,109

DATED        : September 12, 1989

INVENTOR(S)  : Hibbard et al.

It is certified that error appears in the above-identified patent and that said Letters Patent is hereby corrected as shown below:

On the title page, item [75] delete the following names:

--Agnes K. Potepan, Richard E. White, Barry T. Knight and Howard H. Bryant--.

Signed and Sealed this

Fifteenth Day of May, 1990

Attest:

HARRY F. MANBECK, JR.

*Attesting Officer*   *Commissioner of Patents and Trademarks*